US005156698A

United States Patent [19]

Roberts

[11] Patent Number: 5,156,698

[45] Date of Patent: Oct. 20, 1992

[54] INTEGRAL PACKAGING FOR PUZZLE POSTCARD AND OTHER PRODUCTS AND METHOD OF MAKING

[76] Inventor: Dean Roberts, P.O. Box 217, Schenevus, N.Y. 12155

[21] Appl. No.: 565,436

[22] Filed: Aug. 10, 1990

[51] Int. Cl.[5] .............. B32B 31/18

[52] U.S. Cl. .............. 156/108; 156/257; 156/268; 156/277; 156/291; 40/158.1; 40/159; 273/153 R; 273/157 A; 229/92.8

[58] Field of Search .............. 156/108, 257, 268, 277, 156/291; 206/232, 562, 563, 564; 273/157 A, 153 R; 40/156, 158.1, 159, 159.2, 160; 229/92.8

[56] References Cited

U.S. PATENT DOCUMENTS

| | | | |
|---|---|---|---|
| 2,670,961 | 3/1954 | Winters | 273/153 R |
| 3,677,399 | 7/1972 | Tatar | 206/232 |
| 3,709,763 | 1/1973 | O'Neil | 156/291 |
| 3,989,570 | 11/1976 | Orlando et al. | 156/277 |
| 4,413,434 | 11/1983 | Rupert et al. | 40/159 |
| 4,531,765 | 7/1985 | Shulman | 156/108 |
| 4,640,030 | 2/1987 | Wood et al. | 40/158.1 |
| 4,815,742 | 3/1989 | Augustine | 273/157 A |

*Primary Examiner*—Caleb Weston
*Attorney, Agent, or Firm*—Thomas A. O'Rourke

[57] ABSTRACT

A method for manufacturing a puzzle post card comprising providing a first backing, adhering a picture to one surface of said backing, adhering said first backing to a second backing containing an address means whereby only the perimeter of said first backing is adhered to said second backing, cutting said first backing in the non-adhered to portion to form a puzzle, adhering a plastic cover over said puzzle to hold said puzzle in place during mailing.

9 Claims, 2 Drawing Sheets

INTEGRAL PACKAGING FOR PUZZLE POSTCARD AND OTHER PRODUCTS AND METHOD OF MAKING

Postcards have a long history. At vacation time the mails are full of these pithy missives spreading photographs and brief salutations from friends and relatives. Once the recipient has read the message and gazed at the photograph with joy, or relief that he is not there, the postcard is frequently relegated to the waste basket.

Because postcards have limited usefulness the times when the public uses them are infrequent and limited primarily to vacations or brief notices about meetings, manufacturers of postcards have searched for ways to increase the market for postcards. Manufacturers of novelty products also seek products that will attract the purchasing public's eye. In an attempt to satisfy this market a number of products are developed. One such idea is disclosed by U.S. Pat. No. 3,677,399 to Tatar. This patent discloses a puzzle with a plastic overcoat. Attached to one side of the puzzle is a post card to facilitate sending the product through the mails. In the manufacture of the product, a puzzle is made in which the pieces are assembled in a tray. The tray is wrapped with a plastic sheet which forms an envelope or wrapping. The sheet includes an upper portion which is folded over to lie above the lower portion with a connecting edge portion. The remaining three edges of the package are heat sealed. The plastic material is a heat shrinkable plastic and after the edges have been sealed, the assembly is heated to about 300° F. to cause the plastic sheeting to shrink. After the wrapping procedure has been completed, the postcard is adhesively secured to the plastic sheeting. Once the postcard has been delivered to the recipient, the plastic sheeting is opened and the postcard and sheeting material is disposed of.

The prior art has several distinct disadvantages. First, the method of manufacture requires the use of expensive heat shrinkable plastic as the wrapping material. Heat shrinkable plastic is frequently oriented during manufacture either biaxially or uniaxially which can be an expensive complex process. Alternatively the film is stretched and irradiated to hold the plastic in stabilized condition. The extra processing to render a film shrinkable adds to the cost of the film. Besides the additional expense, the heat shrinkable material requires the application of high temperatures to the product to be packaged on at least two occasions. The first occasion is when the edges of the plastic cover must be heat sealed. While all three edges can be heat sealed simultaneously in many instances the edges must be sealed singly. After the edges have been heat sealed the entire package must be heat shrunk by the application of high temperatures in the order of 300° F.

The heating to cause shrinkage of the product must be carefully controlled. Too much heat causes a rupture or void in the seal. Too little heat could lead to insufficient sealing and thus damage to the product during shipment from dust and/or moisture. In addition, excess heat could damage the product to be packaged. Injury to the operator from the heating surface is also a consideration.

Another disadvantage of the prior art picture puzzle postcards is that once the plastic overcoat has been removed, the recipient has no indication or reminder of who the sender was or what the sentiments of the sender were on the postcard. Also, in today's ecologically sensitive world, it is desirous to use as little plastic packaging material as possible as many plastic materials, particularly the type which are heat shrinkable are not normally biogradable.

The disadvantages of the prior art are overcome by the present invention as described in detail below.

It is an object of the present invention to provide a method of manufacturing a puzzle postcard which is not as heat intensive as prior methods.

It is an object of the present invention to provide a puzzle postcard that reduces the use of ecologically damaging plastic packaging.

It is also an object of the present invention to provide a puzzle postcard that retains the identity of the sender after the packaging has been removed by the recipient.

It is also an object of the present invention to provide a method of simultaneously manufacturing and packaging a number of puzzle postcards.

It is a further object of the present invention to provide a packaging material which avoids the use of an expensive heat shrinkable plastic yet retains the clarity and rigidity of such packaging material.

It is a further object of the present invention to provide an improved package for products needing a rigid cardboard backing and a plastic cover.

These and other objects of the present invention are hereinafter described in the following specification of which the following is is a brief description of the drawings.

DETAILED DESCRIPTION OF THE LAMINATED POSTCARD OF THE PRESENT INVENTION

Figure 1:
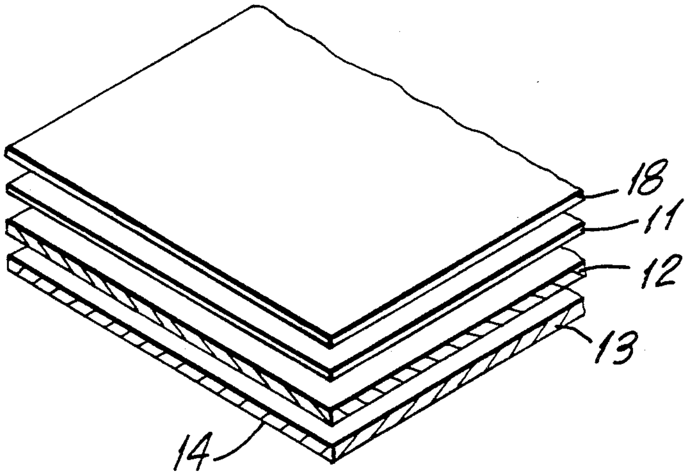
FIG. 1 is an exploded view of the postcard material of the present invention.

The face on the puzzle 11 is preferably a layer of paper bearing the pictorial representation that is laminated to a frame means 12 preferably comprising a sheet or backing of, for example cardboard, as seen in FIG. 1. The frame means may also be wood, particle board, plastic, or other suitable material. The layer of paper is adhered to the frame means 12 by a suitable adhesive.

The combined laminate of the printed sheet and cardboard backing are then further laminated adhered to a base 13 which can be second sheet or backing of, for example cardboard, as seen in FIG. 1. This backing can also be comprised of other materials as in the case of the frame means. The first backing is laminated to the second backing by an adhesive which is applied only to the areas that will not be cut into puzzle pieces. This is shown in more detail in FIG. 2 where the glued areas 15 and 16 have had an adhesive applied. A suitable adhesive is a screen printable pressure sensitive adhesive such as KIWOPRINT TC 2500 VP1 sold by KIWO America, Ltd. The non-glued areas 17 will be cut into puzzle pieces and because they are unglued the pieces will be removable. A preferred method of applying the adhesive is by a silk screen method. In the silk screen method the adhesive is applied by means of a squeegee to only the area to be glued. Other methods of applying the adhesive are also possible. The bottom portion of the second cardboard backing 13 functions as the address side 14 of the puzzle postcard. The address portion may be printed directly on the bottom portion or applied separately by means of an adhesive.

Figure 2:
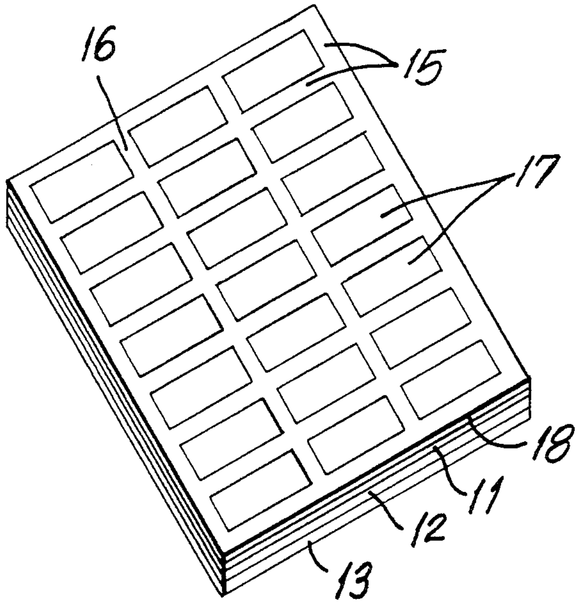
FIG. 2 is an assembly of puzzle postcards of the present invention.
Figure 3:
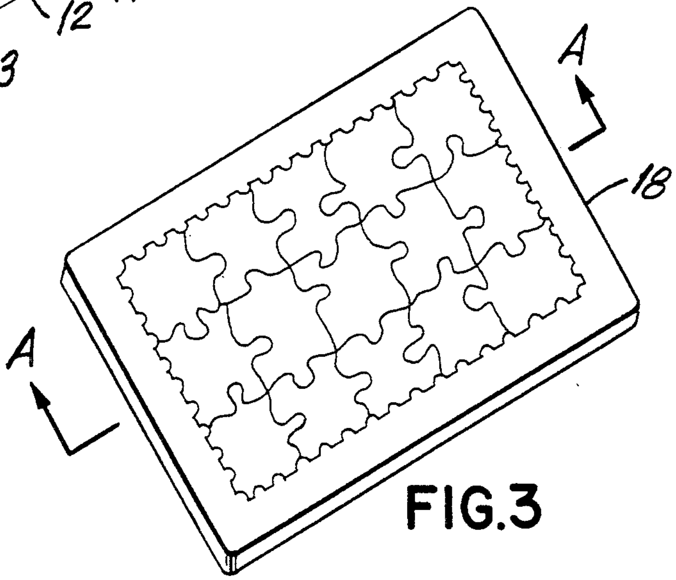
FIG. 3 is a puzzle postcard of the present invention depicting the interlocking pieces of the puzzle.

The multi-layered assembly is then die cut in a three step operation into separate puzzles. In the initial step a cut is made preferably a die cut through the first two layers (printed sheet 11 and cardboard backing 12 thereupon forming puzzle pieces contained in trays formed by the portion of the frame means 12 about the perimeter of the puzzle pieces as seen in FIGS. 2 and 3. Since only glued areas 15 and 16 of frame means 12 are adhered to the base 13, the unglued portions are removable after cutting. About the perimeter of the cut puzzle pieces, is glued portion of frame means 12. Following the die cut step a clear plastic cover sheet 14 is laminated to the printed surface 11. The plastic may be any suitable plastic such as a rubber modified polystyrene, an acetate, polyvinyl chloride, PET, LLDPE, LDPE, MDPE and blends thereof or may be cellophane and is preferably clear or transparent. If desired the plastic may be tinted a color. The plastic layer 18 is adhered to the printed surface 11 by a suitable means such as silk screening. The glue is applied only in the areas of the picture which have not been die cut into puzzle pieces. Finally, the entire multi-layered assembly is then die cut into finished individual units as shown in FIG. 3.

Each furnished unit consists of a glued on plastic cover sheet to hold the puzzle pieces properly in the tray with the tray underside serving the addressable surface. The finished units can be mailed as postcards. Upon delivery, the recipient can remove the puzzle pieces from the holding tray and reassemble the puzzle either back in the tray or on a separate surface.

Figure 4:
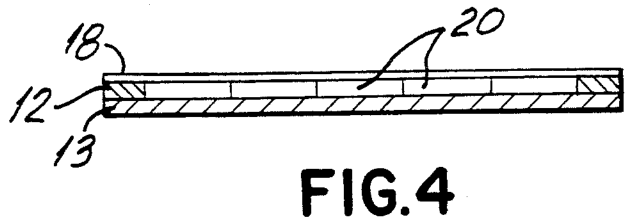
FIG. 4 is a view taken along A - A of FIG. 3.
Figure 5:
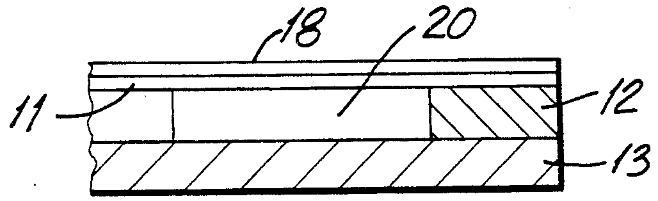
FIG. 5 is an enlarged view of a portion of FIG. 4.
Figure 6:
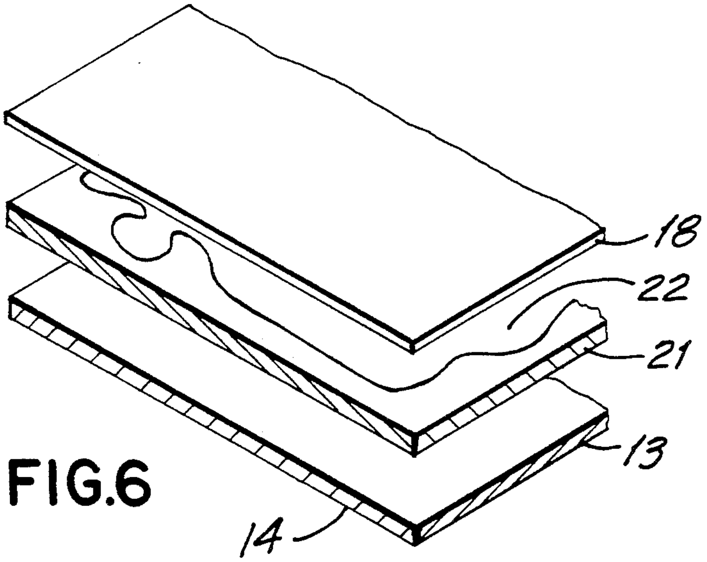
FIG. 6 is an alternate embodiment of the invention useful in packaging articles that are bulkier than puzzle pieces.
Figure 7:
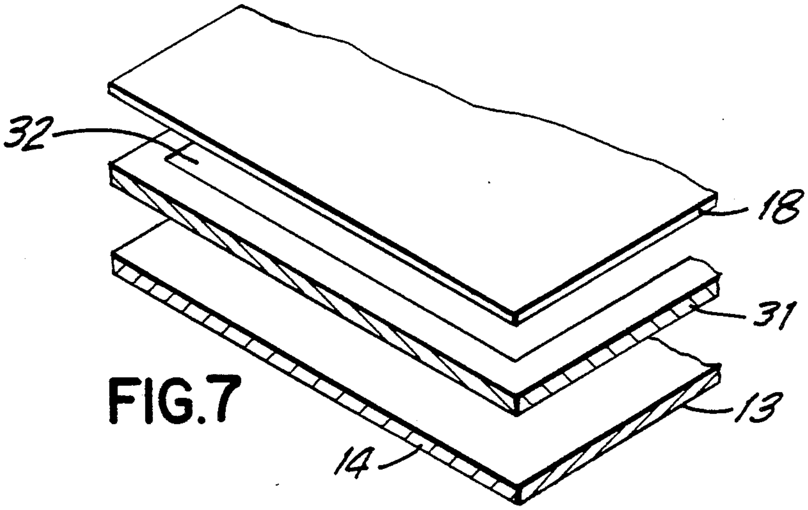
FIG. 7 is another alternate embodiment showing packaging for a needlepoint kit.

FIG. 4 shows a side view of the puzzle postcard of the present invention wherein the individual puzzle pieces 20 are nested in the tray formed by the cardboard's backing 12 and 13. This is shown in more detail in FIG. 5.

In an alternative embodiment a frame 21 may be thicker to provide an area in which a wide variety of products of different shapes and thicknesses may be packaged in the opening formed after die cutting. The resulting package can be used for such novelties as jewelry, toys, heat transfers etc. In this embodiment the thickness of frame may vary with the size of the product. In addition, the opening 22 in frame 21 may be die cut to fit the shape of the product.

In another alternative embodiment for example, a needlepoint project or other product can be similarly packaged. In such a package a frame 31 with a needlepoint fabric contained therein has a backing 13 applied thereto. The fabric may be loose in the opening 32 of the frame or the fabric may be stretched in the frame. Similarly, the needlepoint could be sold in the frame already completed and when received, the backing and the plastic sheet may be removed. Preferaby, the backing is adhered to the frame by an easily removed adhesive material so that the frame is not damaged upon removal of the backing. Over the frame the plastic sheet 18 may be laminated preferably by silk screening to the upper surface of the perimeter of the frame. Preferably the adhesive should be selected so that it does not mar the frame when the plastic is removed.

I claim:

1. A method of manufacturing a puzzle post card comprising forming an assembly by:

a) providing a first backing comprised of a sheet having an upper surface and a lower surface;

b) adhering a layer bearing a pictorial representation for each post card to be made to said upper surface of said first backing;

c) adhering the lower surface of said first backing to a second backing whereby only the perimeter of each post card to be made is adhered to said second backing and a portion of said first backing within the perimeter is not adhered to said second backing;

d) forming puzzle pieces by cutting through the layer bearing said pictorial representation and said first backing in said unadhered portion of said first backing for each post card but not cutting through said second backing thereby;

e) applying a plastic sheet over said layer bearing a pictorial representation;

f) cutting the assembly into individual post cards.

2. The method according to claim 1 wherein said first and second backings are cardboard.

3. The method according to claim 2 wherein said layer bearing a pictorial representation is laminated to said first backing.

4. The method according to claim 1 wherein said layer bearing a pictorial representation and said first backing are die cut.

5. The method according to claim 4 wherein said first backing is adhered to said second backing by means of a screen printable pressure sensitive adhesive.

6. The method according to claim 5 wherein said adhesive is applied by silk screening.

7. The method according to claim 6 wherein said plastic sheet is adhered to said layer bearing a pictorial representation by an adhesive applied by silk screening.

8. The method according to claim 5 wherein the surface of said second backing which is not adhered to said first backing is addressable.

9. The method according to claim 8 wherein the assembly is cut into individual postcards by die cutting.

* * * * *